United States Patent [19]

Shirasu et al.

[11] 4,035,586
[45] July 12, 1977

[54] CURRENT SUPPLY SYSTEM FOR TERMINAL DEVICES

[75] Inventors: Hirotoshi Shirasu, Yokohama; Hidetaka Yamashita, Kamakura; Tatsumasa Oonuma, Yokohama; Takeshi Fukuhara, Fujisawa, all of Japan

[73] Assignee: Hitachi, Ltd., Japan

[21] Appl. No.: 660,780

[22] Filed: Feb. 24, 1976

[30] Foreign Application Priority Data

Feb. 26, 1975 Japan .................. 50-22898

[51] Int. Cl.² ........................... H04Q 1/28
[52] U.S. Cl. ........................... 179/16 F
[58] Field of Search ......... 179/16 A, 16 AA, 16 F, 179/81 R, 84 R, 91 R, 99, 18 AH, 70, 77, 18 F

[56] References Cited

U.S. PATENT DOCUMENTS

| | | | |
|---|---|---|---|
| 3,476,881 | 11/1969 | Van Hensbergen et al. | 179/16 A |
| 3,522,384 | 7/1970 | Ricketts et al. | 179/16 F |
| 3,621,143 | 11/1971 | Chambers, Jr. | 179/16 F |

*Primary Examiner*—Thomas A. Robinson
*Attorney, Agent, or Firm*—Craig & Antonelli

[57] ABSTRACT

A current supply system for terminal devices in which the line circuits are divided into groups in accordance with the line impedance thereof between an exchange or switching network and respective terminal devices or telephone sets, and a different voltage is applied to respective groups of line circuits which corresponds to the current matching the line impedance for the respective groups of line circuits.

3 Claims, 1 Drawing Figure

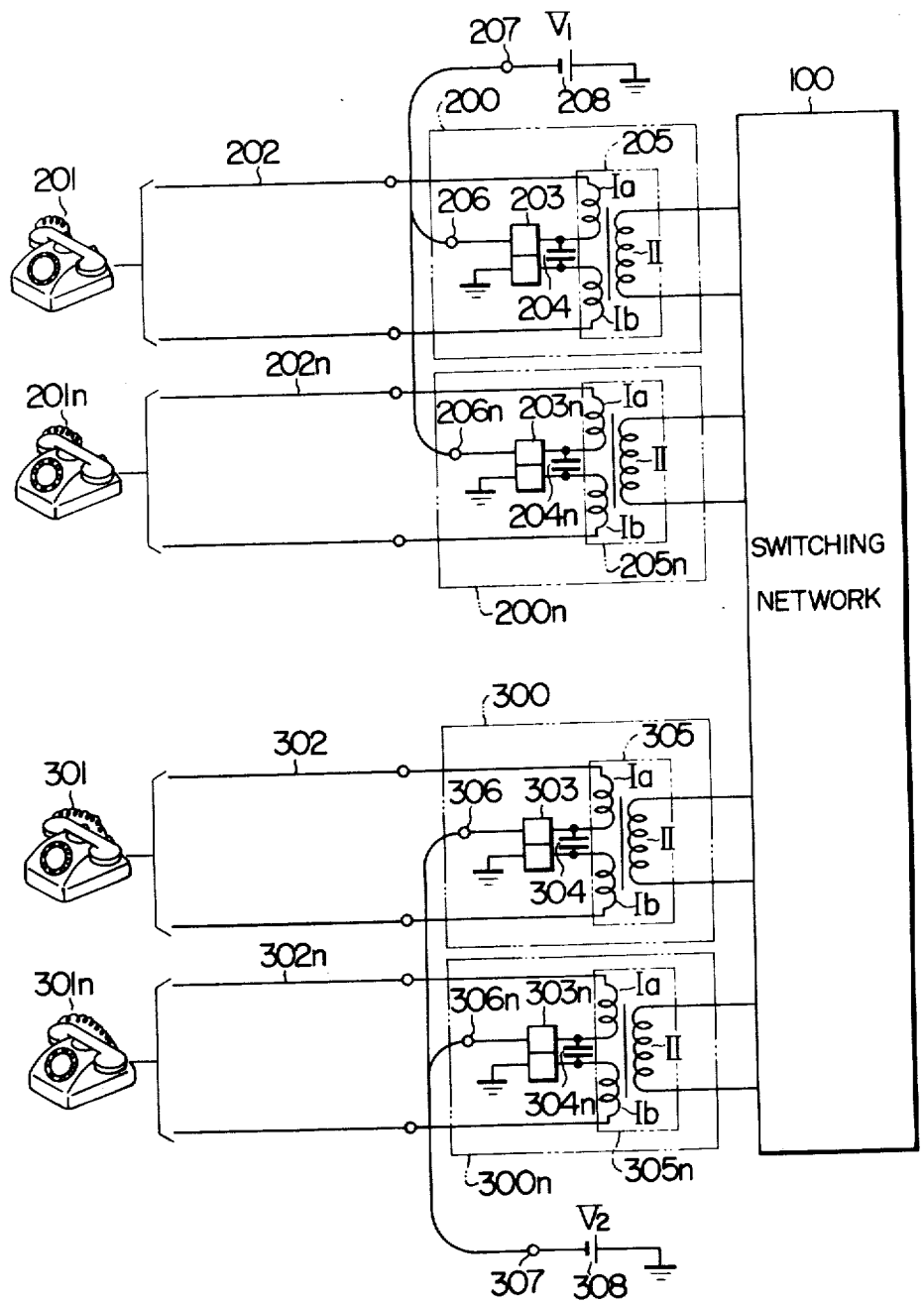

CURRENT SUPPLY SYSTEM FOR TERMINAL DEVICES

This invention relates to a current supply system for supplying respective predetermined currents to terminal devices connected through lines to a communication equipment.

With a conventional cross-bar exchange, since the application of a speech current to a telephone set is effected by means of a trunk circuit which is operatively connected to the line every time a call occurs, it is necessary to use a circuit and voltage so selected as to match the maximum line impedance between the exchange and telephone set. An exchange of either space division or time division type incorporated with semiconductor elements which have recently been placed into practical use also encounters difficulties for passing a large current through speech path switch elements of the exchange, so that it is common to supply a speech current by way of a line circuit associated with individual telephone sets. In the latter case, with a single power source, there also arises a need for matching the telephone set with a maximum line impedance. However, if the line circuit having impedance matching the telephone set associated with maximum line impedance is connected to a low impedance line, an increase in power consumption in the line or an increase in heat generation in line relays results. Thus, where a concentrated incorporation of line circuits or rich incorporation thereof on a printed circuit board is provided to miniaturize the exchange, the increase in the heat generation has an adverse influence upon other circuits of the exchange on account of limited incorporation concentration, degradation of characteristics due to temperature rise in relays per se, or ambient temperature rise.

An object of the invention is to provide a current supply system capable of improving the incorporation concentration for circuits and relieving the temperature-proof characteristics of elemental parts to be used by reducing power consumption and heat generation in the current supply circuit thereby to suppress temperature rise.

The invention is characterized by the fact that line circuits are grouped in accordance with the line impedance thereof between an exchange and respective telephone sets, and that a voltage is applied to respective groups of line circuits which corresponds to the current matching the line impedance for respective groups of line circuits.

Other objects and features of the invention will fully be understood taken in conjunction with the accompanying drawing in which the single FIGURE shows a circuit diagram of a current supply system embodying the invention.

In the single FIGURE, numerical symbols 201, ..., and 201n, on one hand, designate telephone sets each connected to separate primary windings la and lb of respective transformers 205, ..., and 205n in line circuits 200, ..., and 200n through respective low impedance lines 202, ..., and 202n of, for example, relatively short length, and numerical symbols 301, ..., and 301n, on the other hand, designate telephone sets each connected to separate primary windings la and lb of respective transformers 305, ..., and 305n in line circuits 300, ..., and 300n through respective high impedance lines 302, ..., and 302n of, for example, relatively long length. The two separate primary windings la and lb of respective transformers 205, ..., and 205n are connected with each other through respective capacitors 204, ..., 204n. Similarly, the two separate primary windings la and lb of respective transformers 305, ..., and 305n are connected with each other through respective capacitors 304, ..., and 304n. While one winding la of the primary winding of respective transformers 205, ..., and 205n is connected to respective relay terminals 206, ..., and 206n through one coil of respective line relays 203, ..., and 203n, the other winding lb is grounded through the other coil of the line relays 203, ..., and 203n. Similarly, one primary winding la of respective transformers 305, ..., and 305n is connected to respective relay terminals 306, ..., and 306n through one coil of respective line relays 303, ..., 303n, and other primary winding lb is grounded through the other coil of respective line relays 303, ..., and 303n.

Secondary winding II of respective transformers 205, ..., and 205n and 305, ..., and 305n is connected to a switching network 100. The switching network 100 may be realized in terms of either known space division type or time division type. A detailed description of the switching network, however, will not be given herein because it has no direct relation to the subject of the invention.

The relay terminals 206, ..., and 206n respectively associated with the telephone sets 201, ..., and 201n each connected to the low impedance lines 202, ..., and 202n are connected in common to a power supply terminal 207 connected to one pole of a power source 208 of a low voltage $V_1$. The relay terminals 306, ..., and 306n respectively associated with the telephone sets 301, ..., and 301n each connected to the high impedance lines 302, ..., and 302n are connected in common to a power supply terminal 307 connected to one pole of a power source 308 of a high voltage $V_2$. The voltage $V_1$ and $V_2$ are determined in accordance with a line impedance such that currents caused to flow through lines associated with telephone sets 201, ..., or 201n and 301, ..., or 301n when these telephone sets are off hook take substantially the same optimum values.

For example, when the telephone set 201 is off hook, a speech current is supplied to the telephone set 201 through ground, power source 208, power supply terminal 207, relay terminal 206, line relay 203, primary winding la of transformer 205, line 202, telephone set 201, line 202, coil of line relay 203 associated with primary winding lb of transformer 205, and ground. The speech current continues to flow while the telephone set 201 is off hook. An alternating signal such as voice current from the telephone set 201 flows through the primary winding la of transformer 205, capacitor 204 and primary winding lb thereby to interfere with the secondary winding II of transformer 205 at which a corresponding alternating signal is induced which in turn is transmitted to the switching network 100. Conversely, a voice current from the switching network 100 counterflows through the above path to the telephone set 201.

A similar operation holds true for other telephone sets 201n and 301, ..., and 301n when they are off hook.

As will be understood from the foregoing description, according to the invention, line circuits associated with an exchange are grouped (into two groups in the foregoing embodiment) in accordance with the line impedance connected to the respective line circuits, and each respective group of line circuits is connected to a power source of a voltage determined in accordance with the line impedance, whereby a current matching the line impedance is supplied to respective terminal devices such as telephone sets. Where the line circuits are concentratedly incorporated on a printed circuit board as in present-day electronic exchanges, the number of power source wirings for replaceable units can be reduced by grouping a plurality of circuits on the single printed circuit board and preferentially connecting in common the plurality of circuits in the same group to a power source exclusively used therefor by means of printed circuit technique. Further, where the distribution of the line impedances is known in advance, the wiring for the speech current supply sources can be preformed simultaneously with production of the replaceable units.

While, in the foregoing, one embodiment of the invention has been described, it is noted that the invention is not limited to such line circuit arrangement, line impedance distribution, variety of terminal devices, value of speech current and the number of line circuit groups as shown in the single FIGURE.

It should also be noted from the foregoing description that, according to the invention, since not only a load on the speech current supply source but also power consumption in the speech current supply circuit can be reduced, reduction in the heat generation and suppression of temperature rise are realized, thereby assuring increase in incorporation concentration and relief of temperature-proof characteristics of component parts to be used.

What is claimed is:

1. A current supply system for terminal devices comprising a plurality of line circuits each connected to a separate terminal device through a separated line, said line circuits being divided into a plurality of line circuit groups in accordance with the line impedance connected to the line circuit, a plurality of separate power sources of different voltage value associated with the line circuit groups in accordance with the impedance thereof, and means for connecting each one of the line circuits included in each respective line circuit group in common to the respective power source associated therewith.

2. A current supply system according to claim 1, wherein the terminal device comprises a telephone set.

3. A current supply system according to claim 2, wherein the line circuit comprises a transformer whose winding is connected to the line.

* * * * *